US008170736B2

(12) United States Patent
Muta

(10) Patent No.: US 8,170,736 B2
(45) Date of Patent: May 1, 2012

(54) CONTROL DEVICE FOR VEHICLE, HYBRID VEHICLE, METHOD OF CONTROLLING VEHICLE, PROGRAM FOR CAUSING COMPUTER TO EXECUTE THE METHOD OF CONTROLLING THE VEHICLE, AND COMPUTER-READABLE RECORDING MEDIUM RECORDING THE PROGRAM

(75) Inventor: Koichiro Muta, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 591 days.

(21) Appl. No.: 12/375,113

(22) PCT Filed: Jul. 10, 2007

(86) PCT No.: PCT/JP2007/064052
§ 371 (c)(1),
(2), (4) Date: Jan. 26, 2009

(87) PCT Pub. No.: WO2008/023507
PCT Pub. Date: Feb. 28, 2008

(65) Prior Publication Data
US 2009/0265052 A1 Oct. 22, 2009

(30) Foreign Application Priority Data
Aug. 25, 2006 (JP) .................................. 2006-229137

(51) Int. Cl.
G05D 3/00 (2006.01)
(52) U.S. Cl. ............... 701/22; 701/51; 701/60; 477/3; 477/8; 477/15; 180/65.1; 180/65.22; 180/65.265; 318/139; 318/432
(58) Field of Classification Search .................... 701/22, 701/51, 60; 477/3, 8, 15; 318/139, 432
See application file for complete search history.

(56) References Cited

U.S. PATENT DOCUMENTS
5,934,396 A 8/1999 Kurita
(Continued)

FOREIGN PATENT DOCUMENTS
JP 7-18483 B2 3/1995
(Continued)

OTHER PUBLICATIONS
Supplementary European Search Report dated Mar. 14, 2011.

Primary Examiner — Redhwan K Mawari
(74) Attorney, Agent, or Firm — Kenyon & Kenyon LLP

(57) ABSTRACT

A control device includes a target rotation speed determination unit that determines a target rotation speed of an engine, a filtering process unit that receives an output of the target rotation speed determination unit, changes the received output such that the target rotation speed changes gently, and outputs the changed output, a property switching control unit that switches properties of the filtering process unit in accordance with a vehicle state, and a first torque value calculation unit that calculates a target torque of a motor generator in accordance with a difference between the output of the filtering process unit and an actual rotation speed of the engine. Preferably, the property switching control unit increases a time constant of the filtering process in accordance with a shift switch instruction to switch a vehicle state from a traveling state to a neutral state.

15 Claims, 9 Drawing Sheets

U.S. PATENT DOCUMENTS

| | | | |
|---|---|---|---|
| 6,208,034 B1 | 3/2001 | Yamaguchi | |
| 6,233,508 B1 * | 5/2001 | Deguchi et al. | 701/22 |
| 6,253,127 B1 * | 6/2001 | Itoyama et al. | 701/22 |
| 6,328,671 B1 * | 12/2001 | Nakajima et al. | 477/46 |
| 6,335,574 B1 * | 1/2002 | Ochiai et al. | 290/40 C |
| 6,522,959 B1 * | 2/2003 | Sawamura et al. | 701/22 |
| 2004/0162182 A1 | 8/2004 | Joe et al. | |
| 2009/0265052 A1 * | 10/2009 | Muta | 701/22 |

FOREIGN PATENT DOCUMENTS

| | | |
|---|---|---|
| JP | 2000-078705 A | 3/2000 |
| JP | 2001-304022 A | 10/2001 |
| JP | 2004-248410 A | 9/2004 |
| JP | 2004-343839 A | 12/2004 |
| JP | 2005-306238 A | 11/2005 |
| JP | 2006-103541 A | 4/2006 |

\* cited by examiner

DURING VEHICLE STOP(Acc=0, V=0, Tp*=0)
D

D→N AFTER RANGE SHIFT INSTRUCTION

N(AFTER Time480 ms)

CONTROL DEVICE FOR VEHICLE, HYBRID VEHICLE, METHOD OF CONTROLLING VEHICLE, PROGRAM FOR CAUSING COMPUTER TO EXECUTE THE METHOD OF CONTROLLING THE VEHICLE, AND COMPUTER-READABLE RECORDING MEDIUM RECORDING THE PROGRAM

This is a 371 national phase application of PCT/JP2007/064052 filed 10 Jul. 2007, claiming priority to Japanese Patent Application No. 2006-229137 filed 25 Aug. 2006, the contents of which are incorporated herein by reference.

TECHNICAL FIELD

The present invention relates to a control device for a vehicle, a hybrid vehicle, a method of controlling a vehicle, a program for causing a computer to execute the method of controlling the vehicle, and a computer-readable recording medium recording the program.

BACKGROUND ART

In recent years, attention has been focused on a hybrid vehicle that uses both of an engine and a motor for travel of the vehicle to achieve higher fuel efficiency. In relation to control of an engine rotation speed of such a hybrid vehicle, Japanese Patent Laying-Open No. 2001-304022 discloses a device for controlling a rotation speed of an internal combustion engine, in which device, when idle control of the internal combustion engine and rotation speed control that controls a rotation speed of the internal combustion engine by a request for control other than the idle control are performed, reliability of the idle control is improved.

In Japanese Patent Laying-Open No. 2001-304022 described above, there is performed a gradually-changing process in which an engine target rotation speed is gradually changed to lower the same. Therefore, excessive driving of a valve for closing the valve is avoided.

However, the hybrid vehicle can assume various control states, and hence performing the same gradually-changing process all the time may not be suitable depending on a control state of the vehicle, and may cause vibrations perceived by a passenger.

DISCLOSURE OF THE INVENTION

An object of the present invention is to provide a control device for a vehicle, a hybrid vehicle, a method of controlling a vehicle, a program for causing a computer to execute the method of controlling the vehicle, and a computer-readable recording medium recording the program, capable of reducing vibrations of the vehicle.

In short, the present invention is a control device for a vehicle, namely, a control device for a hybrid vehicle which uses both of an internal combustion engine and a first rotating electrical machine for travel of the vehicle, including: a target rotation speed determination unit which determines a target rotation speed of the internal combustion engine; a filtering process unit which receives an output of the target rotation speed determination unit, changes the received output such that the target rotation speed changes gently, and outputs the changed output; a property switching control unit which switches properties of the filtering process unit in accordance with a vehicle state; and a first torque value calculation unit which calculates target torque of the first rotating electrical machine in accordance with a difference between the output of the filtering process unit and an actual rotation speed of the internal combustion engine.

Preferably, the hybrid vehicle further uses a second rotating electrical machine for travel of the vehicle. The control device for the vehicle further includes a second torque value calculation unit which calculates target torque of the second rotating electrical machine in accordance with target torque of a wheel driving shaft and the target torque of the first rotating electrical machine. The property switching control unit increases a time constant of the filtering process in accordance with a shift switch instruction to switch the vehicle state from a traveling state to a neutral state.

Preferably, the hybrid vehicle further includes a first inverter which drives the first rotating electrical machine. The control device for the vehicle deactivates the first inverter in accordance with an instruction to set the vehicle state to a neutral state. The property switching control unit increases a time constant of the filtering process in accordance with a shift switch instruction to switch the vehicle state from a traveling state to the neutral state.

More preferably, the hybrid vehicle further includes a second rotating electrical machine further used for travel of the vehicle, and a second inverter which drives the second rotating electrical machine. The control device for the vehicle further includes a second torque value calculation unit which calculates target torque of the second rotating electrical machine in accordance with target torque of a wheel driving shaft and the target torque of the first rotating electrical machine. The control device for the vehicle deactivates the second inverter when setting the vehicle state to the neutral state.

Further preferably, the hybrid vehicle includes a planetary gear mechanism to which a rotary shaft of the internal combustion engine, a rotary shaft of the first rotating electrical machine, and a rotary shaft of the second rotating electrical machine are connected.

Preferably, the target rotation speed determination unit includes a requested driving torque computing unit which determines requested driving torque based on an accelerator pedal position and a vehicle speed, a first rotation speed output unit which determines requested power output from the internal combustion engine based on the requested driving torque, the vehicle speed, and a state of charge of a power storage device, and calculates a first target rotation speed suitable for outputting the requested power from the internal combustion engine, a second rotation speed output unit which outputs a second target rotation speed suitable for no-load self-sustaining rotation of the internal combustion engine, and a selection unit which switches a selection from the first target rotation speed to the second target rotation speed in accordance with a shift switch instruction to switch the vehicle state from a traveling state to a neutral state, and provides the second target rotation speed as the target rotation speed to the filtering process unit. The property switching control unit switches the properties of the filtering process unit in accordance with the shift switch instruction.

According to another aspect of the present invention, the present invention is a hybrid vehicle including: an internal combustion engine; a first rotating electrical machine used with the internal combustion engine for travel of the vehicle; a power split device to which a rotary shaft of the internal combustion engine, a rotary shaft of the first rotating electrical machine, and a wheel driving shaft are connected; and a control device which controls the internal combustion engine and the first rotating electrical machine. The control device determines a target rotation speed of the internal combustion engine, performs a filtering process such that the determined target rotation speed changes gently, and calculates target torque of the first rotating electrical machine in accordance with a difference between the target rotation speed processed by the filtering process and an actual rotation speed of the internal combustion engine. The control device switches properties of the filtering process in accordance with a vehicle state.

Preferably, the hybrid vehicle further includes a second rotating electrical machine used with the internal combustion engine and the first rotating electrical machine for travel of the vehicle. The control device calculates target torque of the second rotating electrical machine in accordance with target torque of the wheel driving shaft and the target torque of the first rotating electrical machine, and increases a time constant of the filtering process in accordance with a shift switch instruction to switch the vehicle state from a traveling state to a neutral state.

More preferably, the power split device includes a planetary gear mechanism to which the rotary shaft of the internal combustion engine, the rotary shaft of the first rotating electrical machine, and a rotary shaft of the second rotating electrical machine are connected.

Preferably, the control device determines requested driving torque based on an accelerator pedal position and a vehicle speed, determines requested power output from the internal combustion engine based on the requested driving torque, the vehicle speed, and a state of charge of a power storage device, and calculates a first target rotation speed suitable for outputting the requested power from the internal combustion engine, changes the target rotation speed from the first target rotation speed to a predetermined second target rotation speed in accordance with a shift switch instruction to switch the vehicle state from a traveling state to a neutral state, and switches the properties of the filtering process in accordance with the shift switch instruction.

According to still another aspect of the present invention, the present invention is a method of controlling a vehicle which includes an internal combustion engine, a first rotating electrical machine used with the internal combustion engine for travel of the vehicle, and a power split device to which a rotary shaft of the internal combustion engine, a rotary shaft of the first rotating electrical machine, and a wheel driving shaft are connected, including the steps of: determining a target rotation speed of the internal combustion engine; performing a filtering process for switching properties of a filter in accordance with a vehicle state, such that the determined target rotation speed changes gently; and calculating target torque of the first rotating electrical machine in accordance with a difference between the target rotation speed processed by the filtering process and an actual rotation speed of the internal combustion engine.

Preferably, the vehicle further includes a second rotating electrical machine used with the internal combustion engine and the first rotating electrical machine for travel of the vehicle. The control method further includes the step of calculating target torque of the second rotating electrical machine in accordance with target torque of the wheel driving shaft and the target torque of the first rotating electrical machine. The step of performing the filtering process increases a time constant of the filtering process in accordance with a shift switch instruction to switch the vehicle state from a traveling state to a neutral state.

More preferably, the power split device includes a planetary gear mechanism to which the rotary shaft of the internal combustion engine, the rotary shaft of the first rotating electrical machine, and a rotary shaft of the second rotating electrical machine are connected.

Preferably, the step of determining the target rotation speed includes the steps of determining requested driving torque based on an accelerator pedal position and a vehicle speed, determining requested power output from the internal combustion engine based on the requested driving torque, the vehicle speed, and a state of charge of a power storage device, calculating a first target rotation speed suitable for outputting the requested power from the internal combustion engine, and changing the target rotation speed from the first target rotation speed to a predetermined second target rotation speed in accordance with a shift switch instruction to switch the vehicle state from a traveling state to a neutral state. The step of performing the filtering process includes the step of switching properties of the filtering process in accordance with the shift switch instruction.

The present invention, in a further aspect, is a computer-readable recording medium which records a program for causing a computer to execute any of the above-described methods of controlling the vehicle.

The present invention, in a further aspect, is a program for causing a computer to execute any of the above-described methods of controlling the vehicle.

According to the present invention, it is possible to reduce vibrations of the vehicle when control states of the vehicle are switched.

BEST MODES FOR CARRYING OUT THE INVENTION

Figure 1:
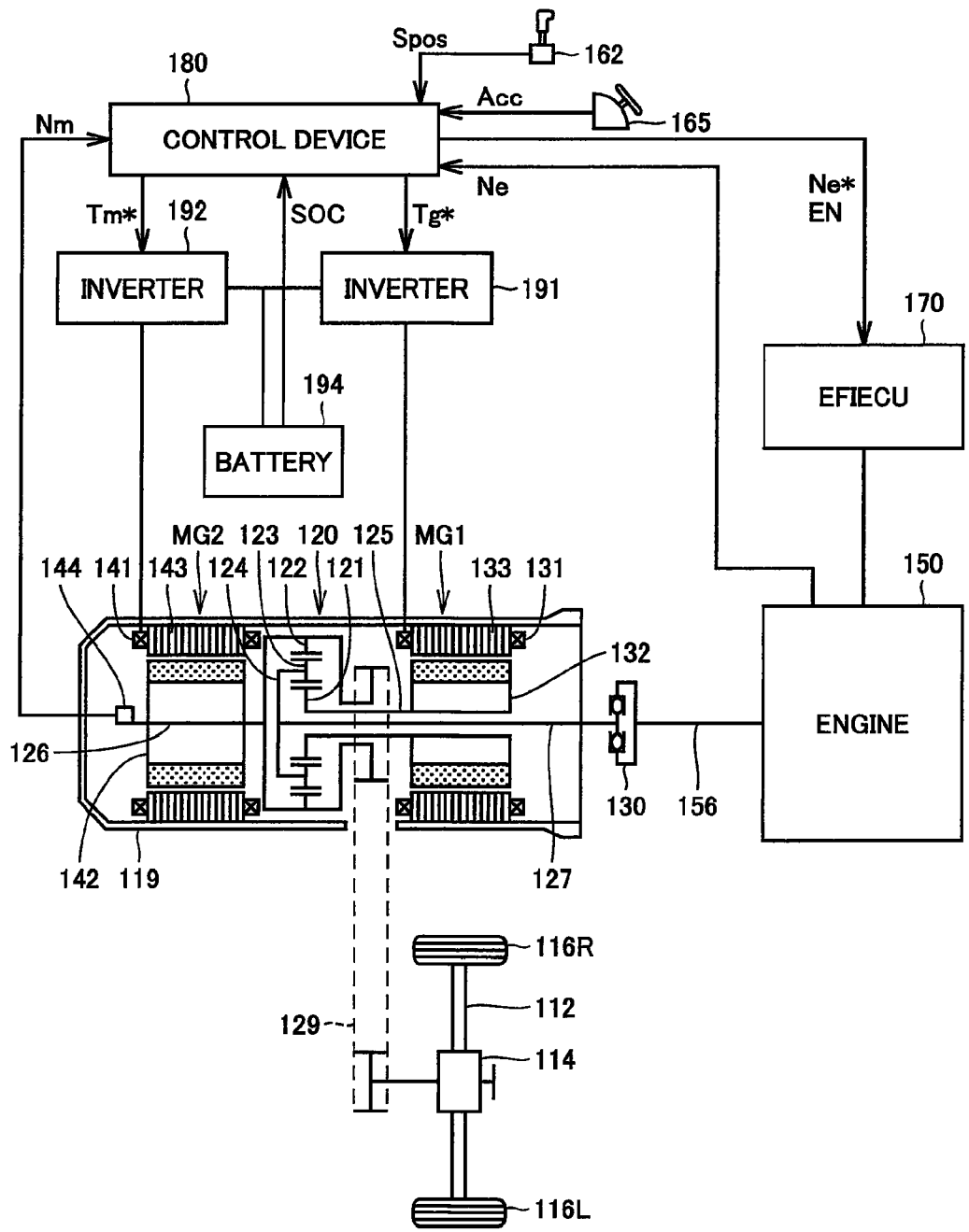
FIG. 1 is a diagram that shows a main configuration of a vehicle 1 according to the present embodiment.

An embodiment of the present invention will hereinafter be described in detail with reference to the drawings. Note that the same or corresponding portions in the drawings are provided with the same reference characters, and the description thereof will not be repeated.

FIG. 1 is a diagram that shows a main configuration of a vehicle 1 according to the present embodiment.

With reference to FIG. 1, vehicle 1 includes an engine 150, a motor generator MG1 used with engine 150 for travel of the vehicle, a planetary gear 120 to which a rotary shaft of engine 150, a rotary shaft of motor generator MG1, and a wheel driving shaft are connected, and a control device 180 that controls engine 150 and motor generator MG1. Control device 180 determines a target rotation speed of engine 150 (hereinafter described in FIG. 3 as Net), performs a filtering process such that the determined target rotation speed changes gently, and calculates target torque Tg* of motor generator MG1 in accordance with a difference between the target rotation speed Ne* processed by the filtering process and an actual rotation speed Ne of engine 150. Control device 180 switches properties of the filtering process in accordance with a vehicle state.

Preferably, hybrid vehicle 1 further includes a motor generator MG2 used with engine 150 and motor generator MG1 for travel of the vehicle. Control device 180 calculates a target torque Tm* of motor generator MG2 in accordance with target torque Tp* of the wheel driving shaft and target torque Tg* of motor generator MG1, and increases a time constant of the filtering process in accordance with a shift switch instruction Spos to switch the vehicle state from a traveling state to a neutral state.

Planetary gear 120 is a planetary gear mechanism to which the rotary shaft of engine 150, the rotary shaft of motor generator MG1, and a rotary shaft of motor generator MG2 are connected.

A configuration of a power system that outputs power for hybrid vehicle 1 will hereinafter be described in further detail based on FIG. 1. Engine 150 provided at the power system is a normal gasoline engine, and rotates a crankshaft 156. An operation of engine 150 is controlled by an EFIECU (Electronic Fuel Injection-Electronic Control Unit) 170.

EFIECU 170 is a one-chip microcomputer that has a CPU (Central Processing Unit), a ROM (Read Only Memory), a RAM (Random Access Memory), and others inside thereof In EFIECU 170, the CPU executes control of an amount of fuel injection in engine 150 and others in accordance with a program recorded in the ROM.

The power system is further provided with motor generators MG1, MG2. Motor generators MG1, MG2 are synchronous motors. Motor generators MG1, MG2 are equipped with rotors 132, 142, respectively, each of which has a plurality of permanent magnets at its outer peripheral surface, and stators 133, 143, respectively, around which three-phase coils 131, 141 each forming a rotating magnetic field are wound, respectively.

Stators 133, 143 are fixed to a casing 119. Three-phase coils 131, 141, which are wound around stators 133, 143 of motor generators MG1, MG2, are connected to a battery 194 via inverters 191, 192, respectively.

Each of inverters 191, 192 is a transistor inverter in which a set of paired transistors serving as switching elements is provided for each phase. Inverters 191, 192 are connected to control device 180. When the transistors in inverters 191, 192 are switched in accordance with a control signal from control device 180, a current flows between battery 194 and motor generators MG1, MG2.

Motor generators MG1, MG2 can operate as motors that are driven to rotate by receiving supply of electric power from battery 194 (this traveling state is hereinafter referred to as power running), and if rotors 132, 142 rotate by external force, can function as electric generators that generate electromotive force across three-phase coils 131, 141, respectively, to charge battery 194 (this traveling state is hereinafter referred to as regeneration).

Engine 150 is mechanically coupled to motor generators MG1, MG2 via planetary gear 120. Planetary gear 120 includes a sun gear 121, a ring gear 122, planetary pinion gears 123, and a planetary carrier 124 that supports planetary pinion gears 123.

Sun gear 121 can rotates at the center of planetary gear 120. Each of planetary pinion gears 123 meshes with an outer periphery of sun gear 121 and an inner periphery of ring gear 122, and can move around sun gear 121 while rotating on its axis. Ring gear 122 can rotate around planetary pinion gears 123.

Crankshaft 156 of engine 150 is coupled to a planetary carrier shaft 127 via a damper 130. Damper 130 is provided for absorbing torsional vibrations generated at crankshaft 156. Rotor 132 of motor generator MG1 is coupled to a sun gear shaft 125. Rotor 142 of motor generator MG2 is coupled to a ring gear shaft 126. Rotation of ring gear 122 is transmitted to a driving shaft 112 and wheels 116R, 116L via a chain belt 129.

Note that a reduction planetary gear or a variable-speed gear mechanism may be provided between ring gear shaft 126 and rotor 142 of motor generator MG2. Further, a modification may also be made such that a gear mechanism is used instead of chain belt 129 to transmit power.

The entire operation of hybrid vehicle 1 is controlled by control device 180. Control device 180 is a one-chip microcomputer that has a CPU, a ROM, a RAM, and others inside thereof, as in EFIECU 170. Control device 180 is connected to EFIECU 170, so that both of them can mutually communicate various types of information.

For example, control device 180 can indirectly control an operation of engine 150 by transmitting to EFIECU 170 a torque command value and a rotation speed command value Ne* required for controlling engine 150, or information such as a current vehicle state. Further, control device 180 can directly control operations of motor generators MG1, MG2 by determining torque command values Tm*, Tg* and controlling switching of inverters 191, 192.

To implement such control, various sensors such as, for example, an accelerator pedal position sensor 165 for detecting an accelerator pedal press-down degree Acc by a driver, a rotation speed sensor 144 for indicating a rotation speed of driving shaft 112, and a shift position sensor 162 provided at a shift lever to detect shift switch instruction Spos are connected to control device 180. In addition, a brake pedal position sensor provided at a brake pedal, not shown, and others are also connected to control device 180.

Ring gear shaft 126 and driving shaft 112 are mechanically coupled, and hence in the present embodiment, rotation speed sensor 144 for indicating a rotation speed of driving shaft 112 is provided at ring gear shaft 126 to also function as a sensor for controlling rotation Nm of motor generator MG2. Further, control device 180 receives inputs such as a rotation angle θs of sun gear shaft 125, a rotation angle θr of ring gear shaft 126, current values Iu1, Iv2 from first inverter 191, current values Iu2, Iv2 from second inverter 192, and a state of charge SOC that indicates remaining capacitance of battery 194, and uses them to perform motor control and the like.

Figure 2:
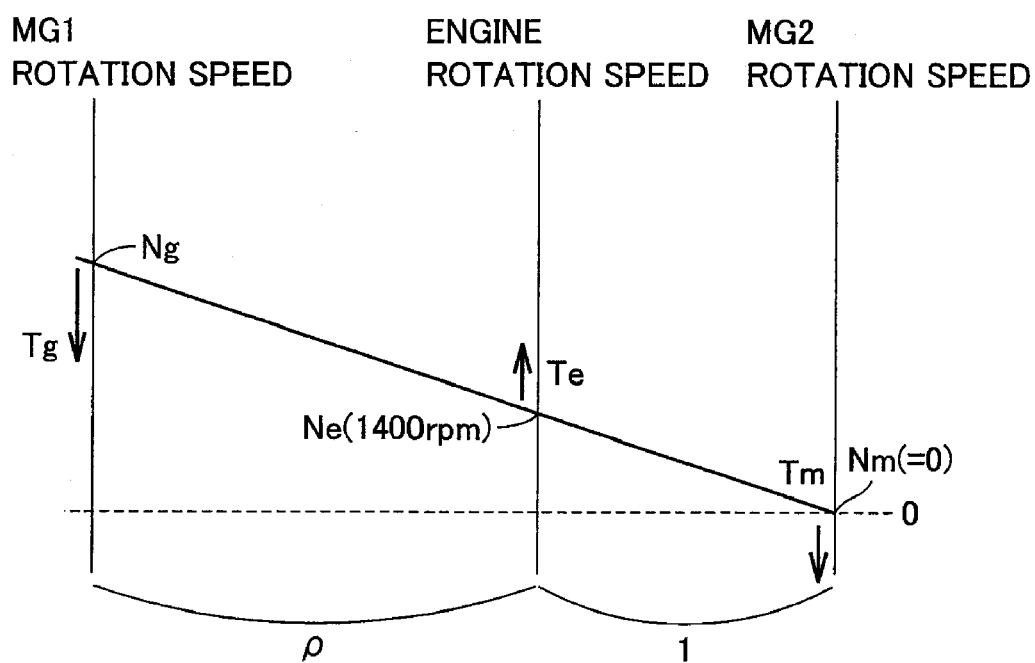
FIG. 2 is a nomographic chart for describing an operation of a planetary gear that serves as a power split device.

FIG. 2 is a nomographic chart for describing an operation of the planetary gear that serves as a power split device.

With reference to FIG. 1 and FIG. 2, planetary gear 120 has a characteristic in which if rotation speeds and torques (both of which are hereinafter collectively referred to as rotation states) of two out of three rotary shafts, namely, sun gear shaft 125, ring gear shaft 126, and planetary carrier shaft 127, are determined, a rotation state of the remaining rotary shaft is determined. The relation as to a rotation speed of each rotary shaft is expressed in the following expressions (1)-(3).

$$Nr = (1+\rho) \cdot Nc - \rho \cdot Ns \quad (1)$$

$$Nc = (Nr + \rho \cdot Ns)/(1+\rho) \quad (2)$$

$$Ns = ((Nc - Nr)/\rho) + Nc \quad (3)$$

If Ns=0, Nr=0, and Nc=0 are substituted into expression (1), expression (2), and expression (3), respectively, in consideration of a state where one shaft is at rest, the results are as follows.

$$Nr = (1+\rho) \cdot Nc; \text{ where } Ns=0 \quad (1A)$$

$$Nc = (\rho \cdot Ns)/(1+\rho); \text{ where } Nr=0 \quad (2A)$$

$$Ns = -Nr/\rho; \text{ where } Nc=0 \quad (3A)$$

Torque is proportional to a reciprocal ratio of a rotation speed, and hence the following expressions (4)-(6) are established as to torque, from a viewpoint of balance of torque.

$$Tr = (1/(1+\rho)) \cdot Tc \quad (4)$$

$$Tc = ((1+\rho)/\rho) \cdot Ts \quad (5)$$

$$Ts = -\rho \cdot Tr \quad (6)$$

Here, Ns and Ts represent a rotation speed and torque of sun gear shaft 125, respectively. Nr and Tr represent a rotation speed and torque of ring gear shaft 126, respectively. Nc and Tc represent a rotation speed and torque of planetary carrier shaft 127, respectively. Further, as shown in the following expression (7), $\rho$ represents a ratio (gear ratio) between a teeth number X of sun gear 121 and a teeth number Y of ring gear 122.

$$\rho = X/Y \quad (7)$$

As shown in FIG. 1, rotation speed Ns and torque Ts of sun gear shaft 125 correspond to a rotation speed Ng and torque Tg of motor generator MG1, respectively. Rotation speed Nr and torque Tr of ring gear shaft 126 correspond to rotation speed Nm and torque Tm of motor generator MG2, respectively. Rotation speed Nc and torque Tc of planetary carrier shaft 127 correspond to engine rotation speed Ne and engine torque Te, respectively. Therefore, the relations in the following expressions (11)-(16) are also established.

$$Nm = (1+\rho) \cdot Ne - \rho \cdot Ng \quad (11)$$

$$Ne = (Nm + \rho \cdot Ng)/(1+\rho) \quad (12)$$

$$Ng = ((Ne - Nm)/\rho) + Ne \quad (13)$$

$$Tm = (1/(1+\rho)) \cdot Te \quad (14)$$

$$Te = ((1+\rho)/\rho) \cdot Tg \quad (15)$$

$$Tg = -\rho \cdot Tm \quad (16)$$

Figure 3:
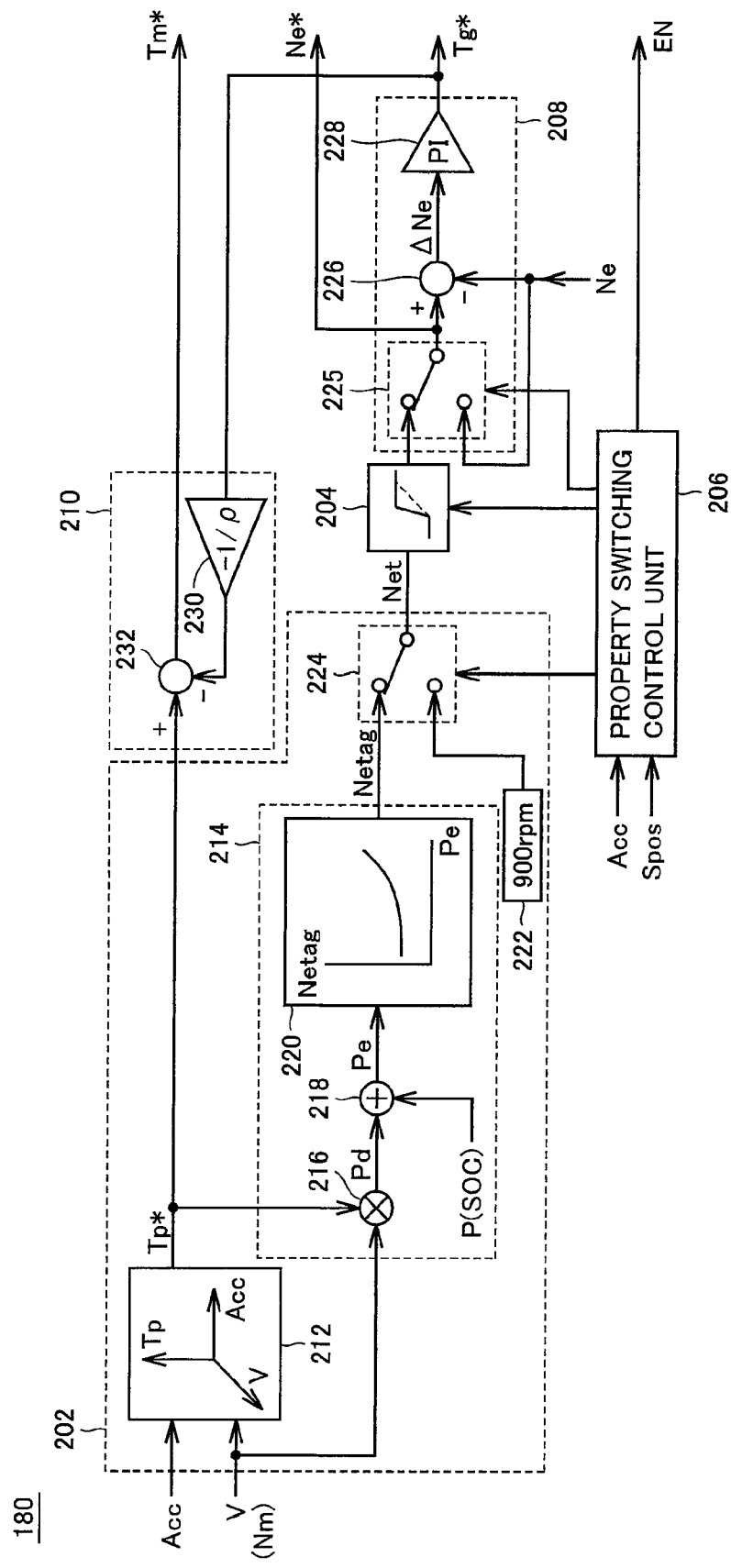
FIG. 3 is a functional block diagram of a control device 180 in FIG. 1.

In order not to break these relations, rotation speeds Ng, Ne, and Nm are aligned in the nomographic chart in FIG. 3.

Hybrid vehicle 1 in the present embodiment can travel in various states, based on an action of planetary gear 120. For example, in a relatively low-speed state where the hybrid vehicle starts traveling, hybrid vehicle 1 travels by running motor generator MG2 by power while stopping engine 150, and thereby transmitting power to driving shaft 112. Similarly, hybrid vehicle 1 may also travel while idling engine 150.

When the hybrid vehicle reaches a prescribed speed, control device 180 controls motor generator MG1 such that positive torque is applied to the relevant motor, and allows motor generator MG1 controlled as such to crank engine 150 to start the same. At this time, reactive torque of motor generator MG1 is also output to ring gear 122 via planetary gear 120. Control device 180 controls an operation of motor generator MG2 such that the reactive torque is cancelled and that requested driving force is output from driving shaft 112.

In a state where engine 150 operates, power of engine 150 is converted into various rotation states each made of a rotation speed and torque, and is output from driving shaft 112, so that the vehicle travels. When engine 150 is operated to rotate planetary carrier shaft 127, sun gear shaft 125 and ring gear shaft 126 rotate under the condition that satisfies the above-described expressions (11)-(16). Power caused by the rotation of ring gear shaft 126 is transmitted as it is to wheels 116R, 116L. Power caused by the rotation of sun gear shaft 125 can be regenerated at motor generator MG1 as electric power. In contrast, if motor generator MG2 is run by power, power can be output to wheels 116R, 116L via ring gear shaft 126. If torque transmitted from engine 150 to ring gear shaft 126 is insufficient, motor generator MG2 is run by power to thereby assist torque. For electric power required for running motor generator MG2 by power, electric power regenerated at motor generator MG1 and electric power stored in battery 194 are used. Control device 180 controls operations of motor generators MG1, MG2 in accordance with requested power that should be output from driving shaft 112.

Further, as shown in the state represented in the nomographic chart in FIG. 2, planetary gear 120 is capable of rotating planetary carrier 124 and sun gear 121 in the state where ring gear 122 stops (Nm=0). Therefore, engine 150 can be operated even in the state where the vehicle stops (Nm=0). For example, if motor generator MG1 is run by power even when the vehicle stops, the torque caused thereby can be used to crank engine 150 to start the same. If remaining capacitance of battery 194 becomes small, engine 150 is operated to output engine torque Te and motor generator MG1 is regeneratively operated by torque Tg, to thereby charge battery 194. At this time, control device 180 controls motor generator MG2 to cause motor generator MG2 to output reactive torque Tm to cancel torque Tg of motor generator MG1, to maintain the vehicle stop state.

The vehicle state shown in the nomographic chart in FIG. 2 is a state where forced charging is performed while a traveling state, namely, a shift is in a D (drive) range and the vehicle is stopped with the brake pressed down on. Note that the forced charging means that electric power generated with the use of motor generator MG1 is used to charge battery 194 that has a lowered state of charge. In this state, motor generators MG1, MG2 generate torques Tg, Tm, respectively.

In such a case, there is considered a circumstance where the vehicle state is shifted from a traveling state to a neutral state. Specifically, there is assumed, for example, a case where the shift is switched from a D range to an N (neutral) range while the vehicle is stopped with the brake pressed down on. In the N range, hybrid vehicle 1 has no clutch and brake as in the normal transmission, and hence allows the rotors of motor generators MG1, MG2 to freely rotate to thereby achieve the neutral range.

Specifically, control device 180 shuts down the gates of power switching elements in inverters 191, 192 to cause a state where torque Tg=0 and Tm=0.

When the vehicle is switched from the forced charging state as in FIG. 2 to the neutral range, namely, the state where Tg=0 and Tm=0, the torques are suddenly removed, so that vibrations occur to the vehicle. While the vehicle travels, these vibrations are not so annoying because of irregularities on a road and others. However, when the vehicle stops, these vibrations are sensed as a shock large enough to be perceived by a passenger.

In vehicle 1 according to the present embodiment, control device 180 provides the following control to thereby reduce the shock.

FIG. 3 is a functional block diagram of control device 180 in FIG. 1. Note that control device 180 can be implemented by software as well as by hardware.

With reference to FIG. 1 and FIG. 3, control device 180 according to the present embodiment is control device 180 for the hybrid vehicle that uses both of engine 150 and motor generator MG1 for travel of the vehicle, and includes a target rotation speed determination unit 202 that determines a target rotation speed Net of engine 150, a filtering process unit 204 that receives an output of target rotation speed determination unit 202, changes the received output such that the target rotation speed changes gently, and outputs the changed output, a property switching control unit 206 that switches properties of filtering process unit 204 in accordance with a vehicle state, and a first torque value calculation unit 208 that calculates target torque Tg* of motor generator MG1 in accordance with a difference ΔNe between the output of filtering process unit 204 and an actual rotation speed Ne of engine 150.

Preferably, hybrid vehicle 1 further uses motor generator MG2 for travel of the vehicle. Control device 180 for the vehicle further includes a second torque value calculation unit 210 that calculates target torque Tm* of motor generator MG2 in accordance with target torque Tp* of the wheel driving shaft and target torque Tg* of motor generator MG1. Property switching control unit 206 increases a time constant τ of a filtering process from 100 ms to 2000 ms, for example, in accordance with shift switch instruction Spos to switch the vehicle state from a traveling state (e.g. D range) to a neutral state (e.g. N range).

Preferably, hybrid vehicle 1 further includes inverter 191 that drives motor generator MG1. Control device 180 for the vehicle deactivates inverter 191 in accordance with an instruction to set the vehicle state to the neutral state (N range). Property switching control unit 206 increases time constant τ of the filtering process from 100 ms to 2000 ms, for example, in accordance with shift switch instruction Spos to switch the vehicle state from the traveling state to the neutral state.

More preferably, hybrid vehicle 1 further includes motor generator MG2 further used for travel of the vehicle, and inverter 192 that drives motor generator MG2. Control device 180 for the vehicle further includes second torque value calculation unit 210 that calculates target torque Tm* of motor generator MG2 in accordance with target torque Tp* of the wheel driving shaft and target torque Tg* of motor generator MG1. Control device 180 for the vehicle deactivates inverter 192 when setting the vehicle state to the neutral state.

Further preferably, hybrid vehicle 1 includes planetary gear 120 to which the rotary shaft of engine 150, the rotary shaft of motor generator MG1, and the rotary shaft of motor generator MG2 are connected.

Target rotation speed determination unit 202 includes a requested driving torque computing unit 212 that determines requested driving torque Tp* based on accelerator pedal position Acc and vehicle speed V (motor rotation speed Nm), a rotation speed output unit 214 that determines requested power Pe output from engine 150 based on requested driving torque Tp*, vehicle speed V, and state of charge SOC of the power storage device, and calculates a first target rotation speed Netag suitable for outputting requested power Pe from engine 150, a second rotation speed output unit 222 that outputs a second target rotation speed (e.g. 900 rpm) suitable for no-load self-sustaining rotation of engine 150, and a selection unit 224 that switches a selection from the first target rotation speed to the second target rotation speed in accordance with shift switch instruction Spos to switch the vehicle state from the traveling state to the neutral state, and provides the second target rotation speed as the target rotation speed to filtering process unit 204. Property switching control unit 206 provides a switch instruction to selection unit 224 and switches properties of filtering process unit 204 in accordance with shift switch instruction Spos.

Requested driving torque computing unit 212 includes, for example, a three-dimensional map that stores in advance requested driving torque Tp* that corresponds to a combination of vehicle speed V and accelerator pedal position Acc.

Rotation speed output unit 214 includes a multiplier 216, an adder 218, and a map 220. Multiplier 216 determines a product of requested driving torque Tp* and vehicle speed V to calculate power Pd. Power Pd is power required for driving an axle at requested driving torque Tp* at vehicle speed V.

Adder 218 adds power Pd to charging power P (SOC) that is set corresponding to state of charge SOC of battery 194, to calculate power Pe requested from engine 150.

Map 220 stores in advance engine target rotation speed Netag suitable for engine 150 to output power Pe. By providing power Pe to Map 220, corresponding target rotation speed Netag is output.

First torque value calculation unit 208 includes a selection unit 225 that selects one of the output of filtering process unit 204 and actual rotation speed Ne of engine 150, a subtractor 226 that determines difference value ΔNe between the output of selection unit 225 and actual rotation speed Ne of engine 150, and a PI processing unit 228 that subjects difference value ΔNe to a PI (proportional-integral) process to thereby calculate target torque Tg* of motor generator MG1.

Second torque value calculation unit 210 includes a multiplication-by-constant process unit 230 that multiplies target torque Tg* of motor generator MG1 by a reciprocal of gear ratio ρ of planetary gear 120 to calculate torque (also referred to as direct torque) transmitted to the driving shaft, and a subtractor 232 that subtracts the torque transmitted from MG1 to the driving shaft from target torque Tp* of the driving shaft to calculate target torque Tm* of motor generator MG2. Note that a coefficient of multiplication-by-constant process unit 230 is derived from the above-described expression (16).

Switching of target rotation speed Net by selection unit 224 will hereinafter be described in detail.

In the state where a driver does not press down on the accelerator pedal at all, requested driving torque Tp*=0, and if charging of battery 194 is not necessary, power Pe requested from the engine=0. An engine rotation speed suitable for outputting engine power of zero is not defined in map 220. Accordingly, in this case, selection unit 224 is switched so that an idling rotation speed is set as target rotation speed Net. This idling rotation speed is predetermined for each type of engine based on its properties, and a certain type of engine has an idling rotation speed of, for example, 900 rpm.

Filtering process unit 204 is provided to alleviate such a discontinuous change in target rotation speed Net. Filtering process unit 204 can be implemented with the use of, for example, a first-order lag filter. The accelerator pedal is continuously changed by the driver, and hence if Acc becomes zero, the time constant of filtering process unit 204 may be a relatively small value (e.g. τ=100 ms).

On the other hand, if the shift lever is manipulated to change the vehicle state from the D range to the N range, for example, requested driving torque Tp*=0 as well, and charging of battery 194 is terminated so that power Pe requested from the engine=0. In this case, target rotation speed Net changes in a stepwise manner, so that the change may become large. Further, in the N range, both of torques Tg, Tm of motor generators MG1, MG2, respectively, must be set to zero so as to implement the neutral state. Therefore, control device 180 performs the following process to reduce vibrations when the vehicle state is changed.

Initially, property switching control unit 206 switches a selection of selection unit 224 from target rotation speed Netag to a prescribed idling rotation speed (e.g. 900 rpm). Concurrently with or prior to this, the time constant is changed in filtering process unit 204 such that even if drastic change occurs, the change is further alleviated. The time constant is changed, for example, from 100 ms to 2000 ms.

When determined time elapses after the shift change instruction was provided (e.g. after 480 ms), property switching control unit 206 switches selection unit 225 such that selection unit 225 selects engine rotation speed Ne rather than the output of filtering process unit 204. This causes ΔNe to be zero, and both of target torques Tg*, Tm* become zero, so that the neutral state is established. Concurrently with this, a control signal EN sent from property switching control unit 206 to EFIECU 170 is deactivated, and target engine rotation speed Ne* sent from property switching control unit 206 to EFIECU 170 is nullified. Thereby engine rotation speed control is passed to EFIECU 170, and EFIECU 170 itself sets an engine rotation speed.

Such switching will be described later in detail with the use of FIGS. 10-12.

Figure 4:
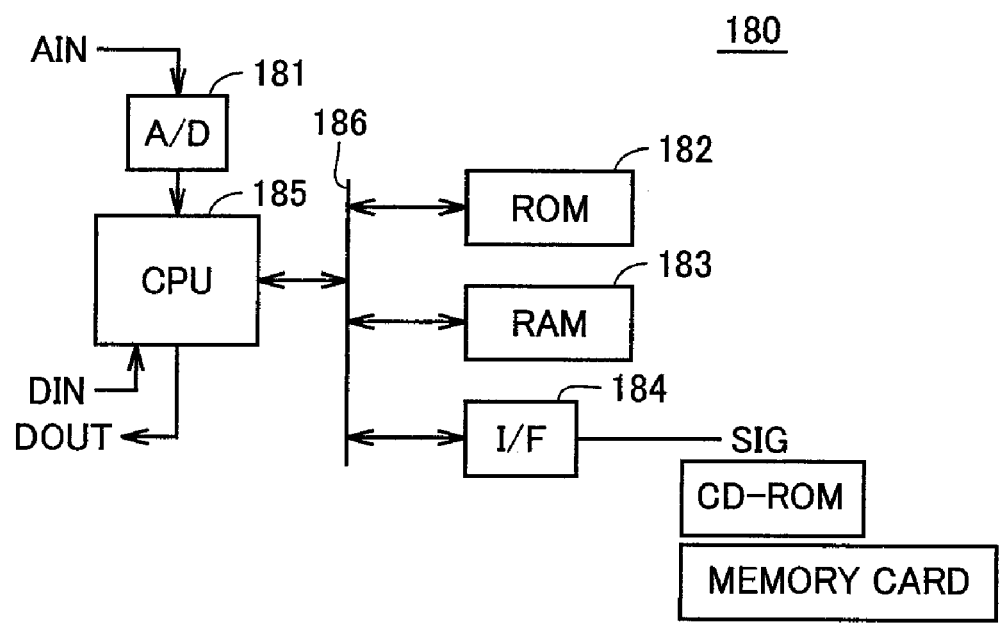
FIG. 4 is a diagram that shows a general configuration of a control device 180 in the case where a computer is used as control device 180.

FIG. 4 is a diagram that shows a general configuration of control device 180 in the case where a computer is used as control device 180.

With reference to FIG. 4, control device 180 includes a CPU 185, an A/D converter 181, a ROM 182, a RAM 183, and an interface unit 184.

A/D converter 181 converts an analog signal AIN such as an output or the like of each of various sensors into a digital signal, and outputs the same to CPU 185. CPU 185 is connected to ROM 182, RAM 183, and interface unit 184 via a bus 186 such as a data bus or an address bus to receive and transmit data.

ROM 182 stores, for example, a program executed in CPU 185, and data such as a map referred to. RAM 183 is a work area in the case where CPU 185 processes data, for example, and temporarily stores various variables.

Interface unit 184, for example, communicates with other ECUs, inputs rewritten data when an electrically-rewritable flash memory or the like is used as ROM 182, and reads a data signal SIG from a computer-readable recording medium such as a memory card or a CD-ROM.

A data input signal DIN and a data output signal DOUT are input to and output from CPU 185, respectively, through an input/output port.

Note that control device 180 is not limited to such a configuration, and may also be implemented by including therein a plurality of CPUs, and may also be implemented by a one-chip microcomputer.

Figure 5:
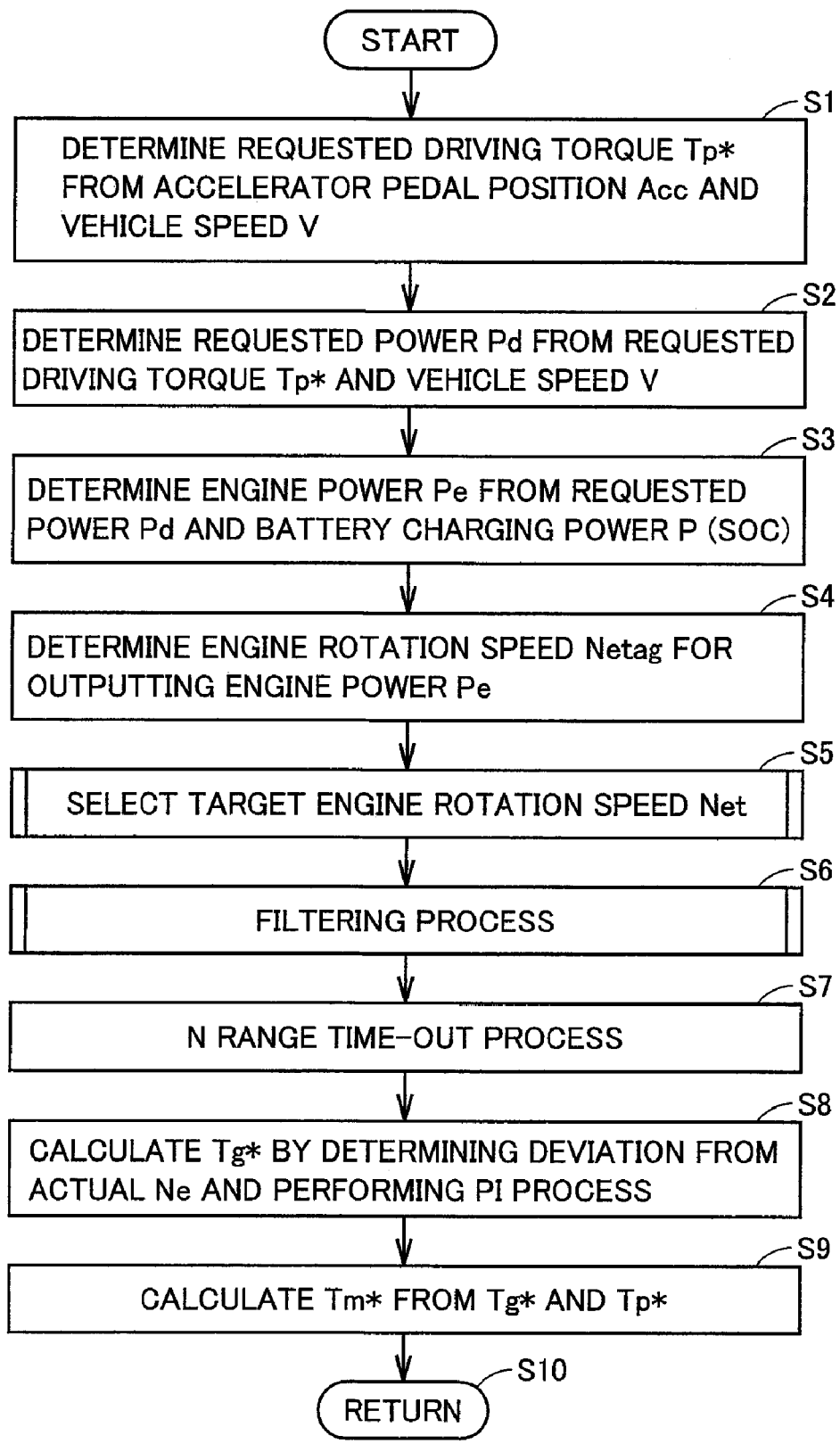
FIG. 5 is a flowchart that shows a control structure of a program executed in control device 180.

FIG. 5 is a flowchart that shows a control structure of a program executed in control device 180. The process in this flowchart is invoked from a prescribed main routine whenever certain time elapses or a prescribed condition is established, and executed.

With reference to FIG. 1 and FIG. 5, control device 180 executes a method of controlling the vehicle which includes engine 150, motor generator MG1 used with engine 150 for travel of the vehicle, and the power split device (planetary gear 120) to which the rotary shaft of engine 150, the rotary shaft of motor generator MG1, and the wheel driving shaft are connected. The method of controlling the vehicle includes the step (S1-S4) of determining a target rotation speed of engine 150, the step (S6) of performing a filtering process for switching properties of a filter in accordance with a vehicle state, such that the determined target rotation speed changes gently, and the step (S8) of calculating target torque Tg* of motor generator MG1 in accordance with a difference between the target rotation speed processed by the filtering process and an actual rotation speed of engine 150.

Note that an N range time-out process (step S7) is executed between step S6 and step S8.

Preferably, the vehicle further includes motor generator MG2 used with engine 150 and motor generator MG1 for travel of the vehicle. The control method further includes the step (S9) of calculating target torque Tm* of motor generator MG2 in accordance with target torque Tp* of the wheel driving shaft and target torque Tg* of motor generator MG1. After step S9, the control is moved to the main routine in step S10. Step S6 of performing the filtering process increases the time constant of the filtering process in accordance with shift switch instruction Spos to switch the vehicle state from the traveling state to the neutral state.

The step (S1-S4) of determining the target rotation speed includes the step (S1) of determining requested driving torque Tp* based on accelerator pedal position Acc and vehicle speed V, the step (S2, S3) of determining power Pe requested from engine 150 based on requested driving torque Tp*, vehicle speed V, and state of charge SOC of the power storage device, the step (S4) of calculating first target rotation speed Netag suitable for outputting power Pe requested from engine 150, and the step (S5) of changing the target rotation speed from first target rotation speed Netag to a predetermined second target rotation speed (e.g. 900 rpm) in accordance with shift switch instruction Spos to switch the vehicle state from the traveling state to the neutral state.

Figure 6:
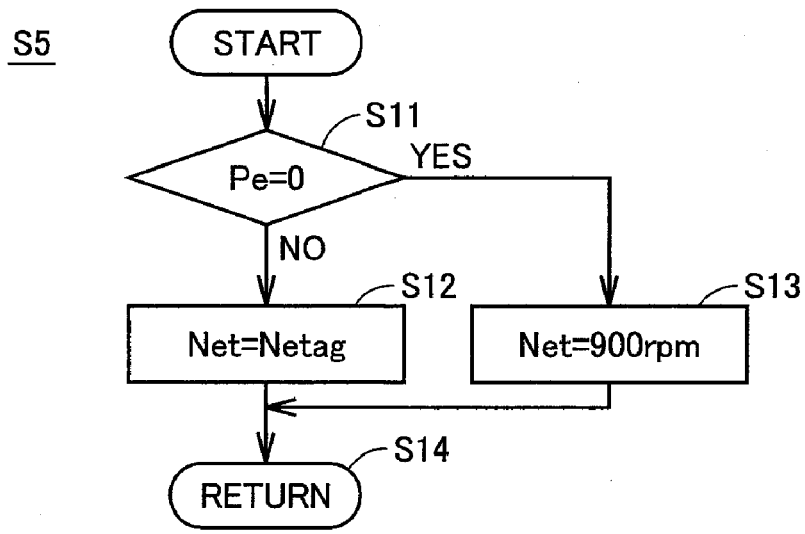
FIG. 6 is a flowchart that shows the details of step S5 in FIG. 5 in which a target engine rotation speed Net is selected.

FIG. 6 is a flowchart that shows the details of step S5 in FIG. 5 in which target engine rotation speed Net is selected. Note that this process also corresponds to the switching process executed to selection unit 224 by property switching control unit 206 in FIG. 3.

With reference to FIG. 3 and FIG. 6, when the process is started, it is determined in step S11 whether power Pe required for the engine is zero or not. This is because if power Pe is zero, corresponding engine rotation speed Netag is not defined in map 220.

If power Pe is not zero (NO in step S11), the process proceeds to step S12, and target engine rotation speed Net is set to Netag read from the map. In contrast, if power Pe is zero (YES in step S11), the process proceeds to step S13, and target engine rotation speed Net is set to a prescribed fixed value (e.g. 900 rpm) corresponding to an idling rotation speed.

When the process in step S12 or step S13 is completed, the process proceeds to step S14, and the filtering process in step S6 in FIG. 5 is successively performed.

Figure 7:
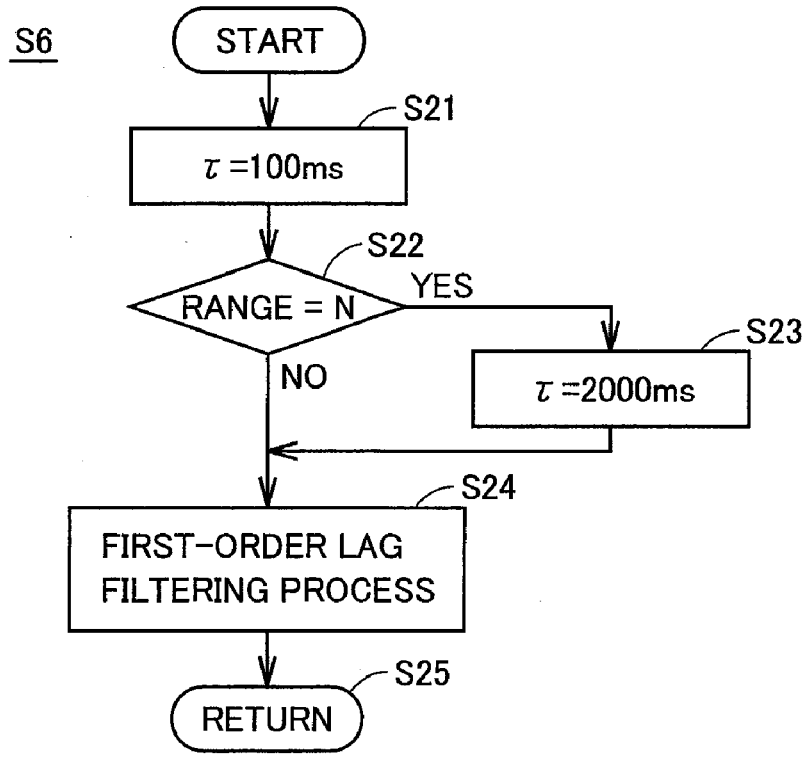
FIG. 7 is a flowchart that shows the details of a filtering process in step S6 in FIG. 5.

FIG. 7 is a flowchart that shows the details of the filtering process in step S6 in FIG. 5. Note that the process also corresponds to the switching process executed to filtering process unit 204 by property switching control unit 206 in FIG. 3.

With reference to FIG. 3 and FIG. 7, step (S6) of performing the filtering process includes the step (S21-S23) of switching properties of the filtering process in accordance with shift switch instruction Spos.

Specifically, when the process is started, time constant τ of the filter is set to a default value (e.g. 100 ms) in step S21. The process successively proceeds to step S22, and it is determined whether an instruction to set the shift range is directed to the N range or not.

If there is an instruction to change the shift to the N range, and if the setting is subsequently maintained at the N range (YES in step S22), time constant τ of the filter is set to a value (e.g. 2000 ms) larger than the default value (step S23), and the process proceeds to step S24. If the shift is not set to the N range (NO in step S22), step S23 is not executed, and the time constant is remained to be the default value, and the process proceeds to step S24.

In step S24, a first-order lag filtering process to which the determined time constant is applied, is executed as the filtering process. In the first-order lag filtering process, the time constant is a constant that shows a response speed, and the smaller the time constant is, the faster the output reaches the final value. Next to step S24, the control is moved to the main routine in step S25.

Note that although the example in which the filtering process is a first-order lag filtering process has been shown as an example in steps S21-S24, these steps are not limited thereto. For the filtering process, any process may be adopted in which a change occurring to an input appears gently at an output. In this case, increasing the time constant of the filtering process corresponds to switching properties of the filtering process such that a change occurring to an input appears more gently at an output.

Effects of reducing vibrations in the hybrid vehicle according to the present embodiment will hereinafter be described by showing actual waveforms.

Figure 8:
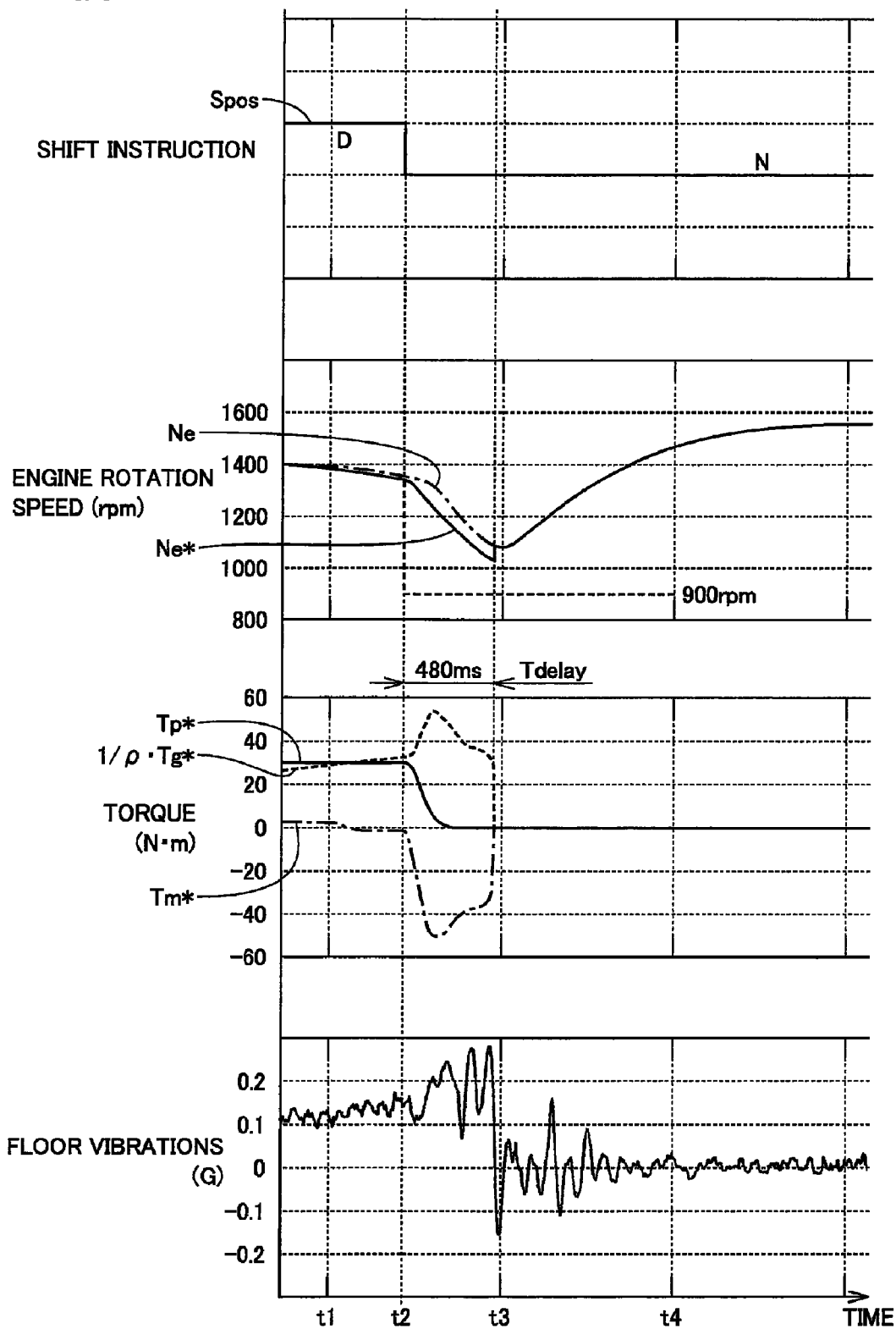
FIG. 8 is an operational waveform diagram in the case where properties of a filtering process unit 204 are fixed in the block diagram in FIG. 3 (which case corresponds to the state where improvement according to the present embodiment has not yet been achieved).

FIG. 8 is an operational waveform diagram in the case where properties of filtering process unit 204 are fixed in the block diagram in FIG. 3 (which case corresponds to the state where improvement according to the present embodiment has not yet been achieved).

With reference to FIG. 3 and FIG. 8, the vehicle state is set to the D range at times t1-t2. In this state, the driver presses down on the brake, and hence the vehicle is at rest. As to the torque, target driving torque Tp* is set to prescribed torque (e.g. approximately 30-40 N•m) so as to adapt to the creep phenomenon found in a general vehicle with an automatic transmission. Further, torque 1/ρ•Tg* is torque at an output portion of multiplication-by-constant process unit 230. As seen from second torque value calculation unit 210, a difference between torque 1/ρ•Tg* and target driving torque Tp* equals to target torque Tm* of motor generator MG2. Stated differently, Tm* is determined such that the following expression (17) is established.

$$Tm^{*}+1/\rho \cdot Tg^{*}=Tp^{*} \qquad (17)$$

At time t2, the driver manipulates the shift lever, and shift switch instruction Spos to switch the shift from the D range to the N range is provided. In accordance with this, target driving torque Tp* changes from the prescribed torque to zero so as not to cause the creep phenomenon. At the same time, selection unit 224 is switched, so that a fixed value (e.g. 900 rpm) is set as target rotation speed Net. The time constant of filtering process unit 204 is a fixed value (e.g. 100 ms), and hence when the filtering process is performed in accordance with this time constant, engine target rotation speed Ne* is decreased to 900 rpm between times t2-t3. Engine rotation speed Ne then changes in concert with this.

At times t2-t3, as a result that target driving torque Tp* and engine target rotation speed Ne* are set as such, 1/ρ•Tg* and Tm* are determined such that the relations in expressions (11)-(16) are satisfied and that expression (17) is established.

At time t3, in accordance with the fact that prescribed time (e.g. 480 ms) elapses after the instruction to change the range was provided, selection unit 225 is switched, so that a setting of ΔNe=0 is forced, and Tg* and Tm* change to zero. This corresponds to the time-out process in step S7 in FIG. 5.

The torque is set to zero from the state where Tg* and Tm* assume somewhat large values, and hence vibrations on the floor of the vehicle change from approximately 0.3 G to approximately −0.2 G at time t3, resulting in vibrations that make a passenger uncomfortable.

Figure 9:
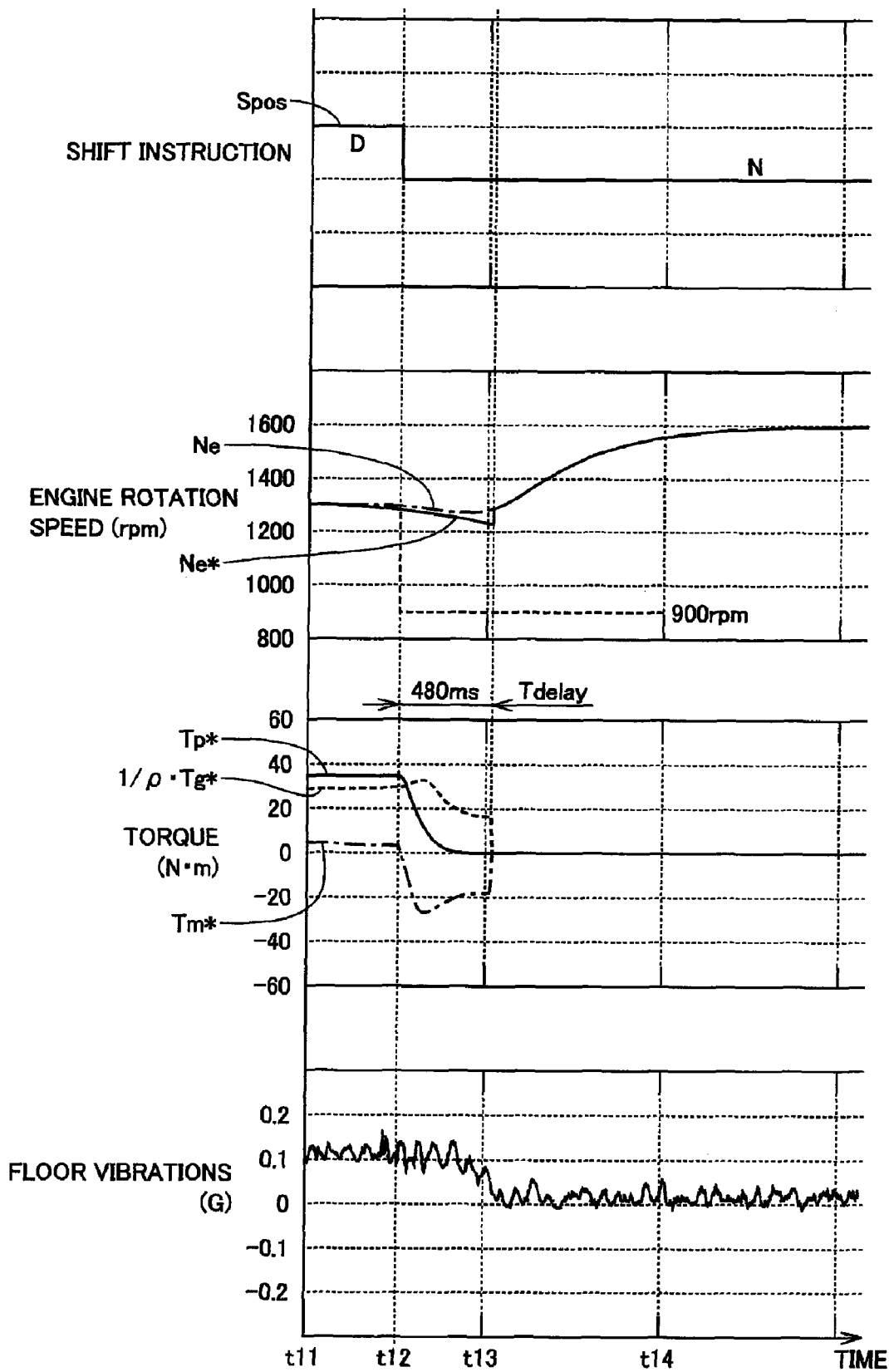
FIG. 9 is an operational waveform diagram in the case where properties of filtering process unit 204 are switched in the block diagram in FIG. 3 (which case corresponds to the state where improvement according to the present embodiment has achieved).

FIG. 9 is an operational waveform diagram in the case where properties of filtering process unit 204 are switched in the block diagram in FIG. 3 (which case corresponds to the state where improvement according to the present embodiment has achieved).

With reference to FIG. 3 and FIG. 9, the vehicle state is set to the D range at times t11-t12. In this state, the driver presses down on the brake, and hence the vehicle is at rest.

As to the torque, target driving torque Tp* is set to prescribed torque (e.g. approximately 30-40 N•m) so as to adapt to the creep phenomenon found in a general vehicle with an automatic transmission. Further, torque 1/ρ•Tg* is torque at the output portion of multiplication-by-constant process unit 230. As seen from second torque value calculation unit 210, a difference between torque 1/ρ•Tg* and target driving torque Tp* equals to target torque Tm* of motor generator MG2. Stated differently, Tm* is determined such that the following expression (17) is established.

At time t12, the driver manipulates the shift lever, and shift switch instruction Spos to switch the shift from the D range to the N range is provided. In accordance with this, target driving torque Tp* changes from the prescribed torque to zero so as not to cause the creep phenomenon.

Figure 10:
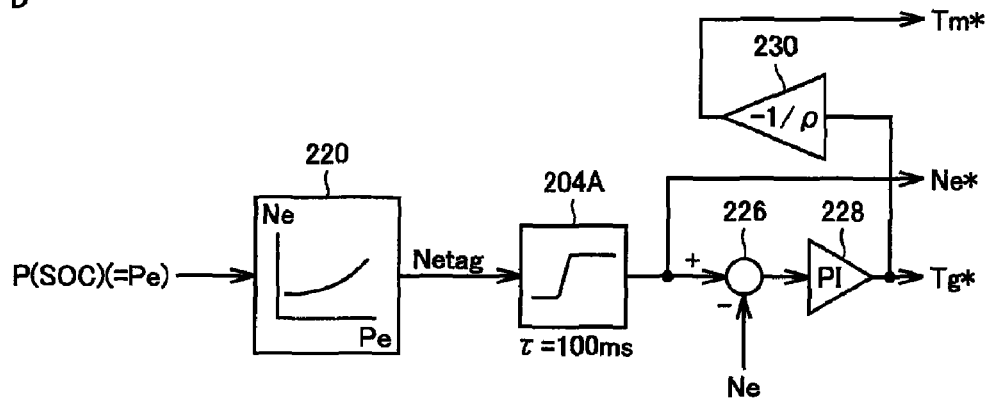
FIG. 10 is a block diagram equivalent to the block diagram in FIG. 3 at time t12 in FIG. 9.

FIG. 10 is a block diagram equivalent to the block diagram in FIG. 3 at time t12 in FIG. 9.

With reference to FIG. 10, engine target rotation speed Netag that corresponds to power P (SOC) with which the battery is charged, is output from map 220, and provided to a filtering process unit 204A in which a setting of time constant τ=100 ms is made.

At time t12, at the same time, selection unit 224 is switched, so that a fixed value (e.g. 900 rpm) is set as target rotation speed Net.

The case shown in FIG. 9 differs from the case shown in FIG. 8 in that the time constant of filtering process unit 204 is changed concurrently with the switching of selection unit 224 (e.g. increased from 100 ms to 2000 ms).

Figure 11:
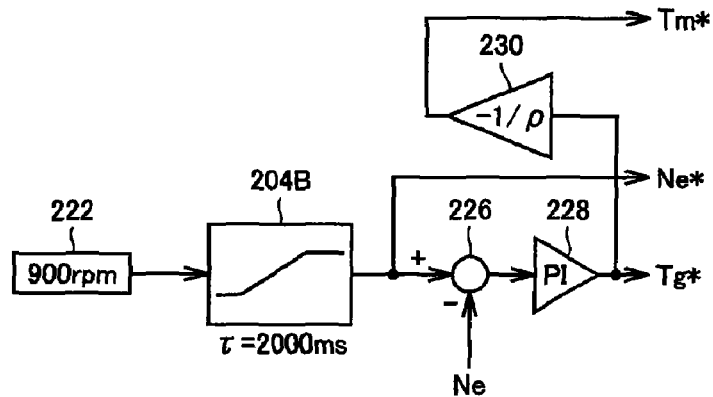
FIG. 11 is a block diagram equivalent to the block diagram in FIG. 3 at times t12-t13 in FIG. 9.

FIG. 11 is a block diagram equivalent to the block diagram in FIG. 3 at times t12-t13 in FIG. 9.

In a filtering process unit 204B shown in FIG. 11 in which a setting of time constant τ=2000 ms is made, the filtering process is performed in accordance with this time constant, and consequently, engine target rotation speed Ne* is decreased to 900 rpm between times t2-t3. However, an amount of decrease is small when compared with the case in FIG. 8. Engine rotation speed Ne then changes in concert with this.

At times t12-t13, as a result that target driving torque Tp* and engine target rotation speed Ne* are set as such, 1/ρ•Tg* and Tm* are determined such that the relations in expressions (11)-(16) are satisfied and that expression (17) is established. When compared with the case shown in FIG. 8, absolute values of both of 1/ρ•Tg* and Tm* are smaller in the case shown in FIG. 9.

At time t13, in accordance with the fact that prescribed time (e.g. 480 ms) elapses after the instruction to change the range was provided, selection unit 225 is switched, so that a setting of DNe=0 is forced, and Tg* and Tm* change to zero. This corresponds to the time-out process in step S7 in FIG. 5. The reason why the time-out process is executed is because, if timing of setting the vehicle to the neutral state is excessively delayed after the instruction to change the range was provided, the driver may feel odd.

Figure 12:
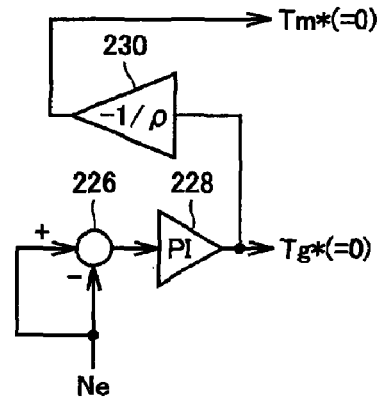
FIG. 12 is a block diagram equivalent to the block diagram in FIG. 3 after time t13 in FIG. 9.

FIG. 12 is a block diagram equivalent to the block diagram in FIG. 3 after time t13 in FIG. 9.

At t13, the control is switched from the control state shown in FIG. 11 to the control state shown in FIG. 12. In the waveforms shown in FIG. 9, as a result that the time constant of filtering process unit 204B is changed to a larger value, absolute values of Tg* and Tm* are smaller than those in the waveforms shown in FIG. 8. Accordingly, even if the torque is set to zero from these values, the waveforms in FIG. 9 show that vibrations on the floor of the vehicle are reduced.

As described above, if properties of filtering process unit 204 are fixed, vibrations on the floor change from approximately 0.3 G to approximately −0.2 G at t3 as shown in FIG. 8, resulting in large vibrations.

In contrast, if properties of filtering process unit 204 are made variable, vibrations on the floor only change from approximately 0.1 G to approximately 0 G at time t13 as shown in FIG. 9, and the vibrations are found to be smaller.

It is thereby possible to implement the hybrid vehicle in which passenger comfort is increased.

Note that the control method disclosed in the above-described embodiment can be implemented by software with the use of a computer. This control method may be read into a computer in the control device for the vehicle from a recording medium (such as ROM, CD-ROM, or memory card) in which a program that causes the computer to perform the relevant control method is recorded in a computer-readable manner, or may also be provided via a communication line.

It should be understood that the embodiment disclosed herein is illustrative and not limitative in all aspects. The scope of the present invention is shown not by the description above but by the scope of the claims, and is intended to include all modifications within the equivalent meaning and scope of the claims.

The invention claimed is:

1. A control device for a hybrid vehicle which uses both of an internal combustion engine and a first rotating electrical machine for travel of the vehicle, comprising:
    a target rotation speed determination unit which determines a target rotation speed of said internal combustion engine;
    a filtering process unit which receives an output of said target rotation speed determination unit, changes the received output such that said target rotation speed changes gently, and outputs the changed output;
    a property switching control unit which switches properties of said filtering process unit in accordance with a vehicle state; and
    a first torque value calculation unit which calculates target torque of said first rotating electrical machine in accordance with a difference between the output of said filtering process unit and an actual rotation speed of said internal combustion engine,
    on a condition that said vehicle state is a traveling state, when the vehicle is at rest with an accelerator pedal not depressed and a power storage device requires charging, said target rotation speed determination unit determining requested power output from said internal combustion engine based on a state of charge of said power storage device, and calculating a first target rotation speed suitable for outputting the requested power from said internal combustion engine, and when said vehicle state is switched from said traveling state to a neutral state, said target rotation speed determination unit outputting a second target rotation speed suitable for no-load self-sustaining rotation of said internal combustion engine, and
    said property switching control unit switching the properties of said filtering process unit in accordance with a shift switch instruction to switch said vehicle state from said traveling state to said neutral state;
    wherein said units are incorporated into said control device.

2. The control device for the vehicle according to claim 1, wherein
    said hybrid vehicle further uses a second rotating electrical machine for travel of the vehicle,
    said control device for the vehicle further comprises a second torque value calculation unit which calculates target torque of said second rotating electrical machine in accordance with target torque of a wheel driving shaft and the target torque of said first rotating electrical machine, and
    said property switching control unit increases a time constant of said filtering process unit in accordance with a shift switch instruction to switch said vehicle state from a traveling state to a neutral state.

3. The control device for the vehicle according to claim 1, wherein
    said hybrid vehicle further includes a first inverter which drives said first rotating electrical machine,
    said control device for the vehicle deactivates said first inverter in accordance with an instruction to set the vehicle state to a neutral state, and
    said property switching control unit increases a time constant of said filtering process unit in accordance with a shift switch instruction to switch said vehicle state from a traveling state to said neutral state.

4. The control device for the vehicle according to claim 3, wherein
    said hybrid vehicle further includes
        a second rotating electrical machine further used for travel of the vehicle, and
        a second inverter which drives said second rotating electrical machine,
    said control device for the vehicle further comprises a second torque value calculation unit which calculates target torque of said second rotating electrical machine in accordance with target torque of a wheel driving shaft and the target torque of said first rotating electrical machine, and
    said control device for the vehicle deactivates said second inverter when setting said vehicle state to said neutral state.

5. The control device for the vehicle according to claim 4, wherein said hybrid vehicle includes a planetary gear mechanism to which a rotary shaft of said internal combustion engine, a rotary shaft of said first rotating electrical machine, and a rotary shaft of said second rotating electrical machine are connected.

6. The control device for the vehicle according to claim 1, wherein
said target rotation speed determination unit includes
a requested driving torque computing unit which determines requested driving torque based on an accelerator pedal position and a vehicle speed,
a first rotation speed output unit which determines the requested power output from said internal combustion engine based on said requested driving torque, said vehicle speed, and the state of charge of the power storage device, and calculates the first target rotation speed suitable for outputting the requested power from said internal combustion engine,
a second rotation speed output unit which outputs the second target rotation speed suitable for no-load self-sustaining rotation of said internal combustion engine, and
a selection unit which switches a selection from said first target rotation speed to said second target rotation speed in accordance with the shift switch instruction to switch said vehicle state from the traveling state to the neutral state, and provides said second target rotation speed as said target rotation speed to said filtering process unit.

7. A hybrid vehicle comprising:
an internal combustion engine;
a first rotating electrical machine used with said internal combustion engine for travel of the vehicle;
a power split device to which a rotary shaft of said internal combustion engine, a rotary shaft of said first rotating electrical machine, and a wheel driving shaft are connected; and
a control device which controls said internal combustion engine and said first rotating electrical machine,
said control device determining a target rotation speed of said internal combustion engine, performing a filtering process such that said determined target rotation speed changes gently, and calculating target torque of said first rotating electrical machine in accordance with a difference between the target rotation speed processed by said filtering process and an actual rotation speed of said internal combustion engine,
on a condition that a vehicle state is a traveling state, when the vehicle is at rest with an accelerator pedal not depressed and a power storage device requires charging, determining requested power output from said internal combustion engine based on a state of charge of said power storage device, and calculating a first target rotation speed suitable for outputting the requested power from said internal combustion engine, and when said vehicle state is switched from said traveling state to a neutral state, outputting a second target rotation speed suitable for no-load self-sustaining rotation of said internal combustion engine, and
said control device switching properties of said filtering process in accordance with a shift switch instruction to switch said vehicle state from said traveling state to said neutral state.

8. The hybrid vehicle according to claim 7, further comprising a second rotating electrical machine used with said internal combustion engine and said first rotating electrical machine for travel of the vehicle, wherein
said control device calculates target torque of said second rotating electrical machine in accordance with target torque of the wheel driving shaft and the target torque of said first rotating electrical machine, and increases a time constant of said filtering process in accordance with a shift switch instruction to switch said vehicle state from a traveling state to a neutral state.

9. The hybrid vehicle according to claim 8, wherein said power split device includes a planetary gear mechanism to which the rotary shaft of said internal combustion engine, the rotary shaft of said first rotating electrical machine, and a rotary shaft of said second rotating electrical machine are connected.

10. The hybrid vehicle according to claim 7, wherein
said control device
determines requested driving torque based on an accelerator pedal position and a vehicle speed, determines the requested power output from said internal combustion engine based on said requested driving torque, said vehicle speed, and the state of charge of the power storage device, and calculates the first target rotation speed suitable for outputting the requested power from said internal combustion engine,
changes said target rotation speed from said first target rotation speed to a predetermined second target rotation speed in accordance with the shift switch instruction to switch said vehicle state from the traveling state to the neutral state, and
increases a time constant of said filtering process in accordance with said shift switch instruction.

11. A method of controlling a vehicle which includes an internal combustion engine, a first rotating electrical machine used with said internal combustion engine for travel of the vehicle, and a power split device to which a rotary shaft of said internal combustion engine, a rotary shaft of said first rotating electrical machine, and a wheel driving shaft are connected, comprising the steps of:
determining by a control device a target rotation speed of said internal combustion engine;
performing by a control device a filtering process for switching properties of a filter in accordance with a vehicle state, such that said determined target rotation speed changes gently; and
calculating by a control device target torque of said first rotating electrical machine in accordance with a difference between the target rotation speed processed by said filtering process and an actual rotation speed of said internal combustion engine,
on a condition that said vehicle state is a traveling state, when the vehicle is at rest with an accelerator pedal not depressed and a power storage device requires charging, the step of determining said target rotation speed determining requested power output from said internal combustion engine based on a state of charge of said power storage device, and calculating a first target rotation speed suitable for outputting the requested power from said internal combustion engine, and when said vehicle state is switched from said traveling state to a neutral state, the step of determining said target rotation speed outputting a second target rotation speed suitable for no-load self-sustaining rotation of said internal combustion engine, and
the step of performing said filtering process switching properties of said filtering process in accordance with a shift switch instruction to switch said vehicle state from said traveling state to said neutral state.

12. The method of controlling the vehicle according to claim 11, wherein
said vehicle further includes a second rotating electrical machine used with said internal combustion engine and said first rotating electrical machine for travel of the vehicle, said control method further includes the step of calculating target torque of said second rotating electrical machine in accordance with target torque of the wheel driving shaft and the target torque of said first rotating electrical machine, and the step of performing said filtering process increases a time constant of said filtering process in accordance with a shift switch instruction to switch said vehicle state from a traveling state to a neutral state.

13. The method of controlling the vehicle according to claim 12, wherein said power split device includes a planetary gear mechanism to which the rotary shaft of said internal combustion engine, the rotary shaft of said first rotating electrical machine, and a rotary shaft of said second rotating electrical machine are connected.

14. The method of controlling the vehicle according to claim 11, wherein the step of determining said target rotation speed includes the steps of determining requested driving torque based on an accelerator pedal position and a vehicle speed, determining the requested power output from said internal combustion engine based on said requested driving torque, said vehicle speed, and the state of charge of the power storage device, calculating the first target rotation speed suitable for outputting the requested power from said internal combustion engine, and changing said target rotation speed from said first target rotation speed to a predetermined second target rotation speed in accordance with the shift switch instruction to switch said vehicle state from the traveling state to the neutral state.

15. A computer-readable non-transitory recording medium which records a program for causing a computer to execute a method of controlling a vehicle which includes an internal combustion engine, a first rotating electrical machine used with said internal combustion engine for travel of the vehicle, and a power split device to which a rotary shaft of said internal combustion engine, a rotary shaft of said first rotating electrical machine, and a wheel driving shaft are connected, the method comprising the steps of:

determining a target rotation speed of said internal combustion engine;

performing a filtering process for switching properties of a filter in accordance with a vehicle state, such that said determined target rotation speed changes gently; and calculating target torque of said first rotating electrical machine in accordance with a difference between the target rotation speed processed by said filtering process and an actual rotation speed of said internal combustion engine, on a condition that said vehicle state is a traveling state, when the vehicle is at rest with an accelerator pedal not depressed and a power storage device requires charging, the step of determining said target rotation speed determining requested power output from said internal combustion engine based on a state of charge of said power storage device, and calculating a first target rotation speed suitable for outputting the requested power from said internal combustion engine, and when said vehicle state is switched from said traveling state to a neutral state, the step of determining said target rotation speed outputting a second target rotation speed suitable for no-load self-sustaining rotation of said internal combustion engine, and the step of performing said filtering process switching properties of said filtering process in accordance with a shift switch instruction to switch said vehicle state from said traveling state to said neutral state.

* * * * *

UNITED STATES PATENT AND TRADEMARK OFFICE
CERTIFICATE OF CORRECTION

PATENT NO. : 8,170,736 B2
APPLICATION NO. : 12/375113
DATED : May 1, 2012
INVENTOR(S) : Koichiro Muta It is certified that error appears in the above-identified patent and that said Letters Patent is hereby corrected as shown below:

| Column | Line | |
|---|---|---|
| 7 | 25 | Change expression (4) to read: --$Tr = (1/(1+\rho)) \cdot Tc$--. |

Signed and Sealed this
First Day of January, 2013

David J. Kappos
*Director of the United States Patent and Trademark Office*